United States Patent Office 3,651,140
Patented Mar. 21, 1972

---

3,651,140
AMINO AND AMIDO COMPOUNDS DERIVED FROM N - 3 - OXOHYDROCARBON-SUBSTITUTED ACRYLAMIDES
Lester E. Coleman, Willoughby Hills, Ohio, assignor to The Lubrizol Corporation, Wickliffe, Ohio
No Drawing. Continuation-in-part of application Ser. No. 657,787, Aug. 2, 1967, which is a continuation-in-part of application Ser. No. 586,391, Oct. 13, 1966. This application Dec. 4, 1969, Ser. No. 882,304
Int. Cl. C07c 103/00
U.S. Cl. 260—561 N
12 Claims

ABSTRACT OF THE DISCLOSURE

N-3-oxohydrocarbon-substituted acrylamides, preferably diacetone acrylamide, react with polyamines and polyamides through the carbonyl group or the olefinic bond. The products are excellent curing agents for epoxy resins. They have low toxicity and skin and eye irritation, and resins cured therewith are stable to light and ultraviolet radiation.

---

This application is a continuation-in-part of copending application Ser. No. 657,787, filed Aug. 2, 1967, which in turn is a continuation-in-part of application Ser. No. 586,391, filed Oct. 13, 1966, both now abandoned.

This invention relates to new compositions of matter, and more particularly to compounds having one of the formulas (A)
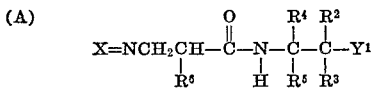

and (B)
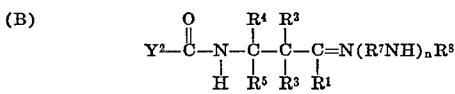

wherein:

each of $R^1$, $R^2$, $R^3$, $R^4$, $R^5$ and $R^8$ is hydrogen or a hydrocarbon radical;
$R^6$ is hydrogen or a lower alkyl radical;
$R^7$ is a divalent hydrocarbon radical or a divalent radical of the formula

$R^9$ being a divalent hydrocarbon radical and the carbonyl group being directly attached to nitrogen;

X=N— is derived from X=NH which is $H_2N(R^7NH)_nR^8$, with N of X=NH being any nitrogen atom of $H_2N(R^7NH)_nR^8$;

$Y^1$ is

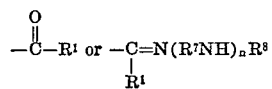

$Y^2$ is

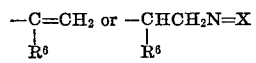

and $n$ is an integer from 1 to 100.

This invention also relates to compositions containing compounds with the above Formulas A and B, said compositions being prepared by reacting an N-3-oxohydrocarbon-substituted acrylamide of the formula

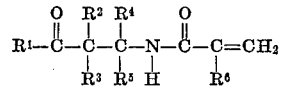

with a nitrogen-containing compound of the formula $H_2N(R^7NH)_nR^8$, wherein $^{1-8}$ and $n$ are as previously defined.

As used herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), nitro and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention.

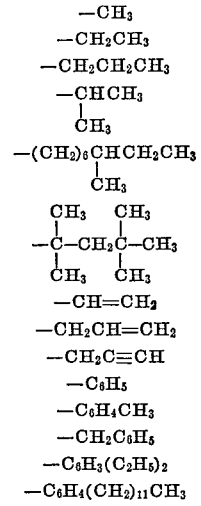
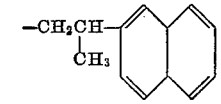
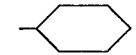
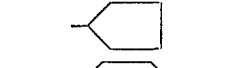
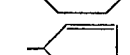
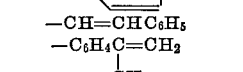
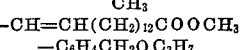
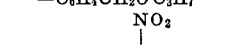

As indicated hereinabove, $R^{1-5}$ and $R^8$ in the compounds of this invention are hydrocarbon radicals. Preferably, they are lower hydrocarbon radicals, the word "lower" denoting radicals containing no more than about 12 carbon atoms. Still more preferably, they are lower alkyl or aryl radicals, most often alkyl.

$R^6$ is preferably hydrogen but may be a lower alkyl radical, usually methyl. $R^7$ is a divalent hydrocarbon radical (preferably) or a polyamide residue, the latter being derived from a polyamide having repeating units of the formula

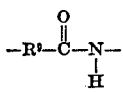

wherein $R^9$ is a divalent hydrocarbon radical. Like $R^{1-5}$ and $R^8$, $R^7$ and $R^9$ are most often lower hydrocarbon radicals, preferably lower alkylene.

The moiety X=N— is so identified because the olefinic bond of an acrylamide can react with any of the amine groups of a polyamine. When $H_2N(R^7NH)_nR^8$ is a polyamide, X=N— will almost always be $R^8(NHR^7)_nNH—$. When $H_2N(R^7NH)_nR^8$ is a polyamine, however, the N of X=N— can be any nitrogen atom thereof.

The radicals $Y^1$ and $Y^2$ are defined as indicated and will vary according to both the starting materials used and the method of preparation. The identity of these units also depends to some extent upon chance, as influenced by the reactivity of the various reaction sites in the N-3-oxohydrocarbon-substituted acrylamide used as the starting material. Thus, the combination of these units may define any of several discrete monomeric reaction products, including cyclic products in which one $R^8$ is a bridging radical, or polymeric structures containing a number of such monomeric units in which Formulas A and/or B represent repeating units. Examples of such compounds are given hereinafter.

The value of the numeral n will also vary according to the reactants used. Where $R^7$ is a hydrocarbon radical, especially alkyl, n is usually from 1 to about 5 at most. If $R^7$ is a polyamide radical, the value of n may be much higher—about 25 to 50, for example.

The compounds of Formulas A and B, respectively, are examples of a series of products obtainable by reaction of numerous compounds, notably active hydrogen compounds, with N-3-oxohydrocarbon-substituted acrylamides through the olefinic double bond or the ketone carbonyl group thereof. In describing these compounds and the reactions leading thereto, reference will usually be made to N-(1,1-dimethyl-3-oxobutyl)acrylamide, hereinafter called diacetone acrylamide, as the N-3-oxohydrocarbon-substituted acrylamide used; but it is to be understood that other compounds of the series, such as N-(1,1-dimethyl-3-oxobutyl)methacrylamide (diacetone methacrylamide) and N-(1,3-diphenyl-1-methyl-3-oxopropyl)acrylamide (diacetophenone acrylamide), may be substituted for diacetone acrylamide in these reactions. The preparation of these N-3-oxohydrocarbon-substituted acrylamides is described in U.S. Pats. 3,277,056 and 3,425,942, and the preparation of reaction products thereof with active hydrogen compounds is described in U.S. Pat. 3,454,669, all of which are hereby incorporated by reference herein.

As previously indicated, the compositions of this invention are most often prepared by reacting an N-3-oxohydrocarbon-substituted acrylamide (such as diacetone acrylamide) with a polyamine or polyamide. Especially desired compositions are obtained from the reaction of diacetone acrylamide with such compounds as:

Polyalkylene polyamines (e.g., ethylene diamine, diethylene triamine, triethylene tetramine, etc.)
Phenylenediamine
Methylenedianiline
Aminoethylpiperazine
Diaminodiphenylsulfone
Dicyandiamide
Versamides (low molecular weight, amine-terminated polyamides)
1-amino-1-methyl-4-(2-amino-2-propyl)-cyclohexane The reaction is usually carried out at a temperature of about 25–150° C. The equivalent weight ratio of diacetone acrylamide to the amine compound should be less than 1; the lowest suitable ratio may be expressed by the formula, $a/a+1$ wherein a is an integer from 0 to about 100. Thus, $a/b$ equivalents of diacetone acrylamide are reacted with at least $a+1/b$ equivalents of the polyamine, b also being an integer from 1 to about 100. The terms "equivalents" and "equivalent weight" refer to the molecular weight of the compound divided by the number of reactive sites therein; for this purpose, diacetone acrylamide is considered to have an equivalent weight equal to its molecular weight, while for a polyamine the equivalent weight is the molecular weight divided by the number of amino groups in the molecule. For an amine-terminated polyamide, the equivalent weight is taken as half the molecular weight.

Of particular interest, especially as epoxy curing agents, are the reaction products of one equivalent of diacetone acrylamide with about 3–6 equivalents (1–2 moles) of a polyethylene polyamine, especially diethylene triamine.

The reaction between diacetone acrylamide and the amine compound is best effected by merely heating a mixture of the two reactants, preferably at about 45–100° C. Ordinarily, no solvent is necessary for the reaction, but such solvents or diluents as alcohols, ketones, ethers, aromatic or aliphatic hydrocarbons or the like may sometimes be used.

The precise chemical structure of the compositions prepared by the above-described method is not known, but they are known to be complex mixtures of compounds of the Schiff's base type and compounds resulting from addition of the amine across the acrylamide double bond. There is evidence that the Schiff's base is formed rapidly and almost exclusively in the first few minutes, and that addition across the double bond (as evidenced by a viscosity increase) occurs slowly during storage. Thus, the following compounds (wherein R is —CH$_2$CH$_2$—) are exemplary of those formed by the reaction of diacetone acrylamide with diethylene triamine.

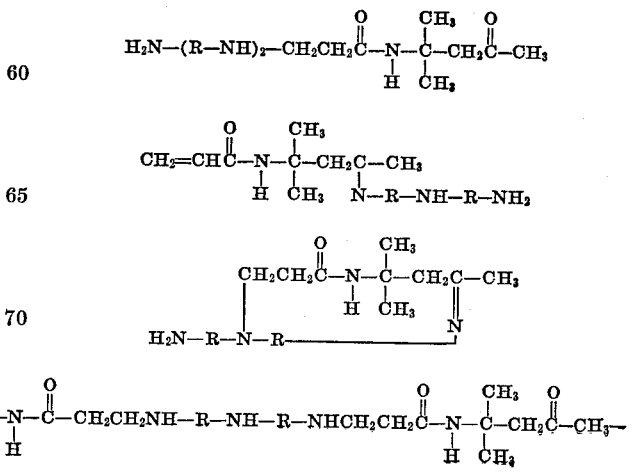

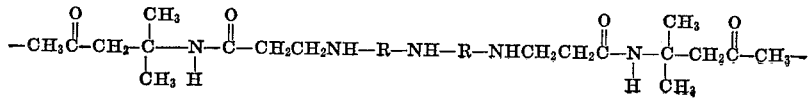

$$-\left[(R-NH)_2-CH_2CH_2\overset{O}{\underset{H}{C}}-N-\underset{CH_3}{\overset{CH_3}{C}}-CH_2C=N-\right]_x$$

Other compounds, such as those formed by linking two diacetone acrylamide residues by one polyamine moiety through the carbonyl group, or through the carbonyl group of one such residue and the olefinic bond of the other, are also possible. It is again emphasized that if the acrylamide-amino linkage is through the olefinic bond it need not necessarily be by connecton with the terminal amino group on the chain; thus, where (as above) the amine is a polyethylene polyamine it may be attached through any one of the amino radicals (although there is evidence that the primary amine groups are principally involved).

Compounds similar to those exemplified above, except that each of the R—NH radicals is replaced by one or more $$R-\overset{O}{\underset{}{C}}-NH$$

radicals, are formed when the polyamine is replaced by an amine-terminated polyamide in the reaction.

The compositions prepared as described herein need not, in general, be further resolved or purified before they are used as epoxy curing agents. However, individual compounds of this invention may be obtained therefrom by known separation techniques such as distillation, fractional crystallization or chromatography. The pure compounds, in addition to their usefulness as epoxy curing agents, can be used as salt formers with oragnic acids; thus, they are useful in the purification of physiologically active compounds such as penicillanic acid.

The preparation of the compositions and compounds of this invention is illustrated by the following examples.

EXAMPLE 1

Diacetone acrylamide, 169 grams (1.0 equivalent), is heated to 66° C. under nitrogen, with stirring, and 51.5 grams (1.5 equivalents) of diethylene triamine is added dropwise. The reaction mixture is heated at 77° C. for one hour and cooled. There is otbained a reaction product of the polyamine with diacetone acrylamide.

EXAMPLE 2

The product of Example 1 is dissolved in hexane and chromatographed on a silica gel thin-layer apparatus of preparative scale. Upon careful development, there are obtained compounds of the following formulas:

(1)
$$CH_3-\overset{O}{\underset{}{C}}-CH_2-\underset{CH_3}{\overset{CH_3}{C}}-N-\overset{O}{\underset{H}{C}}-CH_2CH_2NH(CH_2)_2NH(CH_2)_2NH_2$$

(2)
$$H_2N(CH_2)_2NH(CH_2)_2N=\underset{CH_3}{\overset{CH_3}{C}}-CH_2-\underset{CH_3}{\overset{CH_3}{C}}-N-\overset{O}{\underset{H}{C}}-CH=CH_2$$

EXAMPLE 3

The procedure of Example 1 is repeated, except that 103 grams (3.0 equivalents) of diethylene triamine is used.

EXAMPLE 4

The procedure of Example 1 is repeated, except that 84.5 grams (0.5 equivalent) of diacetone acrylamide and 103.17 grams (3 equivalents) of diethylene triamine are used.

EXAMPLE 5

To a solution of 154 grams (0.91 mole) of diacetone acrylamide in 307 grams of xylene is added 500 grams (1.82 equivalents) of Versamid 125, an amine-terminated liquid polyamide of low molecular weight. The mixture is heated at 72° C. for one hour under nitrogen, with stirring, and is then cooled to room temperature. The product is a 1:2 condensate of the polyamide with diacetone acrylamide. This product is blended with 30 grams of butanol.

EXAMPLE 6

The procedure of Example 5 is repeated except that 77.25 grams (0.46 equivalent) of diacetone acrylamide, 310.5 grams of xylene and 30.85 grams of butanol are used.

EXAMPLE 7

The procedure of Example 1 is repeated, except that the diethylene triamine is replaced by 2.0 equivalents of ethylene diamine.

EXAMPLE 8

The procedure of Example 1 is repeated, using 1.0 equivalent of diacetone methacrylamide and 3.0 equivalents of diethylene triamine.

EXAMPLE 9

The procedure of Example 1 is repeated, using 1.0 equivalent of diacetophenone acrylamide and 3.0 equivalents of diethylene triamine.

EXAMPLE 10

The procedure of Example 1 is repeated, using 3.0 equivalents of diacetone acrylamide and 5.0 equivalents of tetraethylene pentamine.

EXAMPLE 11

The procedure of Example 1 is repeated, except that the diethylene triamine is replaced by 1.5 equivalents of phenylene diamine.

EXAMPLE 12

The procedure of Example 1 is repeated, except that the diethylene triamine is replaced by 1.5 equivalents of aminoethylpiperazine.

EXAMPLE 13

The procedure of Example 1 is repeated, except that the diethylene triamine is replaced by 1.5 equivalents of diaminodiphenylsulfone.

EXAMPLE 14

The procedure of Example 1 is repeated, except that the diethylene triamine is replaced by 1.5 equivalents of dicyandiamide.

The compositions of this invention serve as excellent curing agents for epoxy resins. In particular, these compositions give to the resins cured therewith increased stability to light and ultraviolet rays. They also improve resistance of epoxy paints to chalking, crazing and the like.

One of the advantages of the compositions of this invention is their low toxicity and decreased tendency to irritate skin and eyes, as compared with polyamines and polyamides normally used for curing epoxy resins. Because of these properties, said compositions are harmless to handle and much more convenient to use than more toxic or irritating curing agents. Table I contains toxicity and irritation data, and the classification of the results thereof according to the Federal Hazardous Substances Labeling Act. The figure given as "Toxicity–LD–50" is the relative weight of the composition, in grams per kilogram of body weight, required to kill 50% of the test animals.

The skin and eye irritation figures are roughly proportional to the degree of irritation; that is, the higher the figure the greater the irritation.

TABLE I

| Composition | Toxicity, LD-50 | Skin irritation | Eye irritation | | |
|---|---|---|---|---|---|
| | | | 24 hr. | 48 hr. | 72 hr. |
| Product of Example 1. | 5-10, non-toxic. | 0, non-irritating. | 2.0 Non-irritating | 1.7 | 0 |
| Product of Example 3. | 5-10, non-toxic. | 0, non-irritating. | 2.0 Non-irritating | 1.3 | 1.3 |
| Product of Example 4. | 2-5, toxic. | 0, non-irritating. | 5.7 Non-irritating | 1.7 | 0 |
| Diethylene triamine. | 1-2, toxic. | 8.0, corrosive. | Not graded: eyes severely damaged. | | |
| Versamid 125. | >20, non-toxic. | 0.08, non-irritating. | 32.0 Irritating | 23.7 | 15.7 |
| Diacetone acrylamide. | 2-5, toxic. | 0, non-irritating. | 0 Non-irritating | 0 | 0 |

It will be seen from this table that the compositions of this invention are uniformly low in toxicity and irritant properties, despite the fact that both the amine and the diacetone acrylamide used in their preparation are more toxic or more irritating.

The reaction sequence by which curing of epoxy resins is effected varies according to whether the curing agent contains primary, secondary, or tertiary amine groups. When the amine groups are primary, it is believed that the amine itself is incorporated into the molecule through a crosslinking reaction by which two terminal epoxy groups react with the amine as follows.

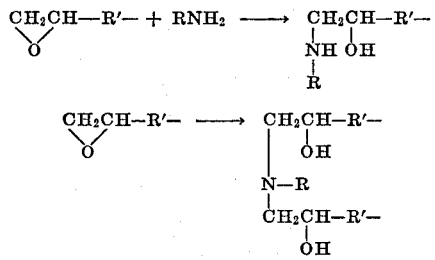

The same type of reaction may be entered into when the curing agent contains two amine groups, either or both of which are secondary; a crosslinking species may then comprise the two amine groups with the linking radical rather than a single amine group.

When the curing agent is a tertiary amine, the mechanism of the crosslinking reaction is believed to involve salt formation with an epoxy group, which then in turn reacts with a second epoxy group to form a direct oxygen bridge between the two. Reaction may then proceed to form a grid-like structure, as indicated in the following reaction scheme.

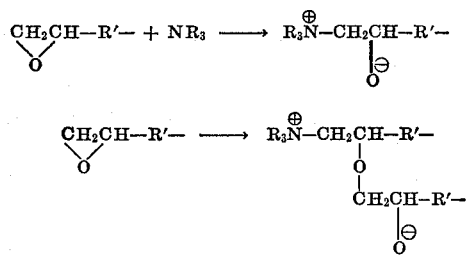

While most primary and secondary amines function as curing agents at room temperature, heat may be required in certain instances, especially with tertiary amines and with other curing agents such as dicyanidamide and its derivatives, to initiate the curing process. From a physical standpoint, the result is substantially the same—formation of an infusible, crosslinked resin—regardless of which kind of curing agent is used.

The stability to light and ultraviolet rays which is exhibited by epoxy resins cured with the nitrogen-containing compositions of this invention is believed to be imparted by the N-3-oxohydrocarbon group. Polymers of N-3-oxo-hydrocarbon-substituted acrylamides, especially diacetone acrylamide, are known to be very stable under similar conditions.

The amounts of the compositions of this invention to be used in the resin as curing agents are usually calculated most conveniently in terms of the amount of amine or polyamide chemically equivalent thereto. About 3–40 parts of amine or polyamide per 100 parts of resin is usually sufficient; the amine can often be present in lesser amounts than the polyamide (preferably about 3–10 phr. for the amine and about 25–40 phr. for the polyamide). About 10–50 phr. of the composition of this invention will provide the desired results in most instances.

The improvement in properties of epoxy resins cured with the compositions of this invention is shown by the following series of tests in which aluminum panels are coated with epoxy paint compositions and then subjected to severe light and weather conditions. The two paint compositions used in this test are constituted as follows:

Paint A

| | Parts by weight |
|---|---|
| Titanium dioxide | 500 |
| Bisphenol A-epichlorohydrin epoxy resin | 500 |
| Methyl isobutyl ketone | 167 |
| Xylene | 167 |
| Ethylene glycol monoethyl ether | 166 |

Paint B

| | Parts by weight |
|---|---|
| Titanium dioxide | 809 |
| Bisphenol A-epichlorohydrin epoxy resin | 900 |
| Methyl isobutyl ketone | 450 |
| Xylene | 450 |

In the first series of tests, 100 parts by weight of Paint A is combined with a quantity of diacetone acrylamidediethylene triamine reaction product sufficient to provide 6 parts of the amine constituent thereof per 100 parts of epoxy resin. The resulting paint composition is then applied by draw-coating to the aluminum panels to give a paint coating 1–1.5 mils thick. The panels are allowed to dry at room temperature and are then subjected to the following conditions.

(1) "Fade-O-Meter" Test—the panels are suspended on a rotating frame in a cabinet and subjected to intense ultraviolet radiation for the test period. After 500 hours and 1200 hours, the panels are evaluated for gloss by means of a Gardner Gloss Meter and for yellowing by means of a reflectometer.

(2) Outdoor Exposure Test—the panels are exposed at a 45° angle, facing south, for the test period. They are then evaluated for gloss as described above.

The panels thus treated are compared with a control in which the diacetone acrylamide-diethylene triamine reaction product is replaced by diethylene triamine, also at 6 parts by weight per 100 parts of epoxy resin.

In the second series of tests, the diacetone acrylamide-polyamide reaction products are added to Paint B in an amount sufficient to provide about 33 parts of the polyamide (either reacted or unreacted) per 100 parts of resin. Aluminum panels are spray-coated with the epoxy paint and allowed to dry, and then are evaluated by the methods described hereinabove. Comparison is made with two controls, one containing a xylene-n-butanol blend of the polyamide alone and the other containing a similar blend of a physical mixture of the polyamide and diacetone acrylamide in the amounts used in Example 5.

The results of these tests are given in Table II. (In the "Gloss" column, the amount of gloss increases with higher readings; under "Yellowing," higher readings indicate a greater degree of yellowing.)

The results of these tests show that the compositions of this invention are superior to unreacted amines and polyamides as curing agents for epoxy paints, in that they decrease discoloration of paints prepared from such resins and also decrease the amount of chalking, cracking and crazing which painted surfaces undergo after prolonged exposure to severe light and atmospheric conditions.

Epoxy resins cured with the compositions of this invention may also be used as additives, in molding applications for impregnating glass fiber mats and the like. For the latter purpose, the mat is generally impregnated with uncured resin and then the curing agent is added. The products have excellent hardness, impact resistance and tensile strength in addition to the improved properties described above.

It is believed that the advantages of the curing agents of this invention derive from a reaction that takes place when the curing agent reacts with the resin. Apparently, the curing agent is hydrolyzed by small quantities of water present in the reaction mass and dissociates into the amine or polyamide and diacetone acrylamide. The former is the active curing ingredient, and the latter serves as a light stabilizer and may also add strength to the resin through homopolymerization or crosslinking. However, the invention is not limited by this or any other theory or proposed reaction mechanism.

$Y^1$ is $$-\overset{O}{\underset{}{C}}-R^1 \text{ or } -\underset{R^1}{\overset{}{C}}=N(R^7NH)_nR^8$$

$Y^2$ is $$-\underset{R^6}{\overset{}{C}}=CH_2 \text{ or } -\underset{R^6}{\overset{}{C}}HCH_2N=X$$

and $n$ is an integer from 1 to 100.

2. A compound according to claim 1 wherein each of $R^1$, $R^4$ and $R^5$ is methyl and each of $R^2$, $R^3$, $R^6$ and $R^8$ is hydrogen.

3. A compound according to claim 2 wherein $R^7$ is a lower alkylene radical.

4. A compound according to claim 3 wherein $R^7$ is an ethylene radical.

5. A compound according to claim 4 wherein $n$ is 2.

TABLE II

| Paint formulation | Curing agent identity | Amount, phr. | Test hours | Gloss Fade-O-Meter | Gloss Outdoor exposure | Yellowing | Remarks |
|---|---|---|---|---|---|---|---|
| A | Diethylene triamine | 6.0 | 0 | 60–65 | 60–65 | | Severe chalking. |
| | | | 500 | 18–23 | 18–21 | .0458 | |
| | | | 1,200 | 8–10 | | .279 | |
| A | Product of Example 1 | 25.7 | 0 | 92–94 | 92–94 | | No chalking. |
| | | | 500 | 82–85 | 94–96 | .0234 | |
| | | | 1,200 | 38–40 | | .227 | |
| A | Product of Example 3 | 15.8 | 0 | 90–92 | 90–92 | | Do. |
| | | | 500 | 80–83 | 87–92 | .0346 | |
| | | | 1,200 | 45–50 | | .252 | |
| A | Product of Example 4 | 10.9 | 0 | 89–92 | 89–92 | | Do. |
| | | | 500 | 80–82 | 87–92 | .0575 | |
| | | | 1,200 | 20–22 | | | |
| B | Polyamide | 30.0 | 0 | 99–100 | 99–100 | | Cracking and crazing. |
| | | | 500 | 82–83 | 92–93 | .0802 | |
| | | | 1,200 | 19–22 | | .352 | |
| B | Polyamide plus diacetone acrylamide | 43.2 | 0 | 100 | 100 | | Do. |
| | | | 500 | 83–85 | 91–93 | .0495 | |
| | | | 1,200 | 35–37 | | .302 | |
| B | Product of Example 5 | 43.2 | 0 | 100 | 100 | | No crazing. |
| | | | 500 | 94–98 | 97–100 | .0242 | |
| | | | 1,200 | 42–45 | | .275 | |
| B | Product of Example 6 | 34.6 | 0 | 100 | 100 | | Do. |
| | | | 500 | 94–98 | 100 | .0376 | |
| | | | 1,200 | 33–35 | | .275 | |

What is claimed is:

1. A compound having one of the formulas (A)
$$X=NCH_2CH-\overset{O}{\underset{R^6}{C}}-\underset{H}{\overset{}{N}}-\underset{R}{\overset{R^4}{C}}-\underset{R^5}{\overset{R^2}{C}}-Y^1$$

and $$Y^2-\overset{O}{\underset{H}{C}}-\underset{R^5}{\overset{R^4}{N}}-\underset{R^3}{\overset{}{C}}-\underset{R^1}{\overset{R^2}{C}}=N(R^7NH)_nR^8$$

wherein:
each of $R^1$, $R^2$, $R^3$, $R^4$, $R^5$ and $R^8$ is hydrogen or a hydrocarbon radical;
$R^6$ is hydrogen or a lower alkyl radical;
$R^7$ is a divalent hydrocarbon radical or a divalent radical of the formula $$-R^9-\overset{O}{\underset{}{C}}-$$

$R^9$ being a divalent hydrocarbon radical and the carbonyl group being directly attached to nitrogen;
X=N— is derived from X=NH which is $$H_2N(R^7NH)_nR^8$$

with N of X=NH being any nitrogen atom of $$H_2N(R^7NH)_nR^8$$

6. A compound according to claim 2 wherein $R^7$ is $$-R^9-\overset{O}{\underset{}{C}}-$$

and $n$ is about 25–50.

7. A composition of matter prepared by reacting, at a temperature of about 25–150° C., $a/b$ equivalents of an N-3-oxohydrocarbon-substituted acrylamine of the formula $$R^1-\overset{O}{\underset{R^3}{C}}-\underset{R^5}{\overset{R^2}{C}}-\underset{H}{\overset{R^4}{C}}-N-\overset{O}{\underset{R^6}{C}}-C=CH_2$$

wherein each of $R^1$, $R^2$, $R^3$, $R^4$ and $R^5$ is individually hydrogen or a hydrocarbon radical, $R^6$ is hydrogen or a lower alkyl radical, and $a$ and $b$ are integers from 1 to about 100, with at least about $$a+1/b$$

equivalents of a nitrogen-containing compound of the formula $H_2N(R^7NH)_nR^8$, wherein $R^7$ is a divalent hydrocarbon radical or a divalent radical of the formula $$-R^9-\overset{O}{\underset{}{C}}-$$

$R^9$ being a divalent hydrocarbon radical and the carbonyl group being directly attached to nitrogen; $R^8$ is hydrogen or a hydrocarbon radical; and $n$ is an integer from 1 to about 100.

8. The composition of claim 7 wherein the N-3-oxo-hydrocarbon-substituted acrylamide is N-(1,1-dimethyl-3-oxobutyl)acrylamide.

9. The composition of claim 8 wherein the nitrogen-containing compound is a polyalkylene polyamine.

10. The composition of claim 9 wherein the nitrogen-containing compound is a polyethylene polyamine.

11. The composition of claim 10 wherein the polyethylene polyamine is diethylene triamine.

12. The composition of claim 11 wherein the equivalent weight ratio of N-(1,1-dimethyl-3-oxobutyl)acrylamide to diethylene triamine is between about 1:3 and 1:6.

References Cited

UNITED STATES PATENTS

| | | | |
|---|---|---|---|
| 3,170,901 | 2/1965 | Melamed et al. | 260—89.7 |
| 3,464,849 | 9/1969 | Ehrig et al. | 117—132 |

LEWIS GOTTS, Primary Examiner

E. G. LOVE, Assistant Examiner

U.S. Cl. X.R.

260—47 EN, 268, 404.5, 557 R, 558 A, 561 A, 561 K, 562 N, 562 K, 562 P; 424—320

UNITED STATES PATENT OFFICE
CERTIFICATE OF CORRECTION

Patent No. 3,651,140  Dated March 21, 1972

Inventor(s) Lester E. Coleman

It is certified that error appears in the above-identified patent and that said Letters Patent are hereby corrected as shown below:

Column 2, line 8, "1-8" should read $--R^{1-8}--$. Column 4, line 19, "a/a+1" should read $--\frac{a}{a+1}--$; line 21, "a+1/b" should read $--\frac{a+1}{b}--$; line 65, the portion of the formula reading "$\underset{N-}{\overset{|}{C}}$" should read $--\underset{N-}{\overset{\|}{C}}--$. Column 7, lines 35 and 59, the portions of the formulas reading "$CH_2CH-R'- \underset{\diagdown O \diagup}{\longrightarrow}$" should read $--CH_2CH-R'-\underset{\diagdown O \diagup}{}--$. Column 9, line 50, the portion of the formula reading "$-\underset{R\ R^5R^3}{\overset{R^4R^2}{\underset{|\ \ |}{\overset{|\ \ |}{C-C}}}}-Y^1$" should read $--\underset{R^5R^3}{\overset{R^4R^2}{\underset{|\ \ |}{\overset{|\ \ |}{C-C}}}}-Y^1--$.

Column 10, line 53, "acrylamine" should read --acrylamide--; line 64, "a+1/b" should read $--\frac{a+1}{b}--$.

Signed and sealed this 4th day of July 1972.

(SEAL)
Attest:

EDWARD M. FLETCHER, JR.
Attesting Officer

ROBERT GOTTSCHALK
Commissioner of Patents